United States Patent [19]
Ernst

[11] 3,951,306
[45] Apr. 20, 1976

[54] PLANTER APPARATUS
[76] Inventor: Arnold E. Ernst, Wolverton, Minn. 56594
[22] Filed: Aug. 20, 1974
[21] Appl. No.: 498,982

Related U.S. Application Data
[62] Division of Ser. No. 417,741, Nov. 21, 1973, Pat. No. 3,886,875.

[52] U.S. Cl. .............................. 221/263; 222/224; 222/367; 111/77
[51] Int. Cl.² ............................................. B65H 3/00
[58] Field of Search ................... 222/148, 216–225, 222/344, 345, 367, 349, 351; 221/263, 277; 111/77, 74

[56] References Cited
UNITED STATES PATENTS
2,463,807   3/1949   Robins ........................... 222/244 X
3,773,224   11/1973  Winslow ............................. 222/367

FOREIGN PATENTS OR APPLICATIONS
831,925   2/1952   Germany ............................. 222/367

Primary Examiner—Robert B. Reeves
Assistant Examiner—H. Grant Skaggs
Attorney, Agent, or Firm—Henderson, Strom & Sturm

[57]  ABSTRACT

A planter apparatus for attachment to a tractor or other draft vehicle and having a pair of vertically disposed interconnected pivoting frames. Front and rear ground engaging wheels are mounted along the longitudinal axis of the lower frame, and a pair of transversely disposed discs are mounted therebetween along the axis and for forming an incision in the ground. A chain and belt drive from the front wheel actuates a rotating seed discharge mechanism in a housing mounted over the rear portion of the discs whereby seed is discharged into the incision. The rear wheel compacts the soil over the incision with the seed therein.

2 Claims, 15 Drawing Figures

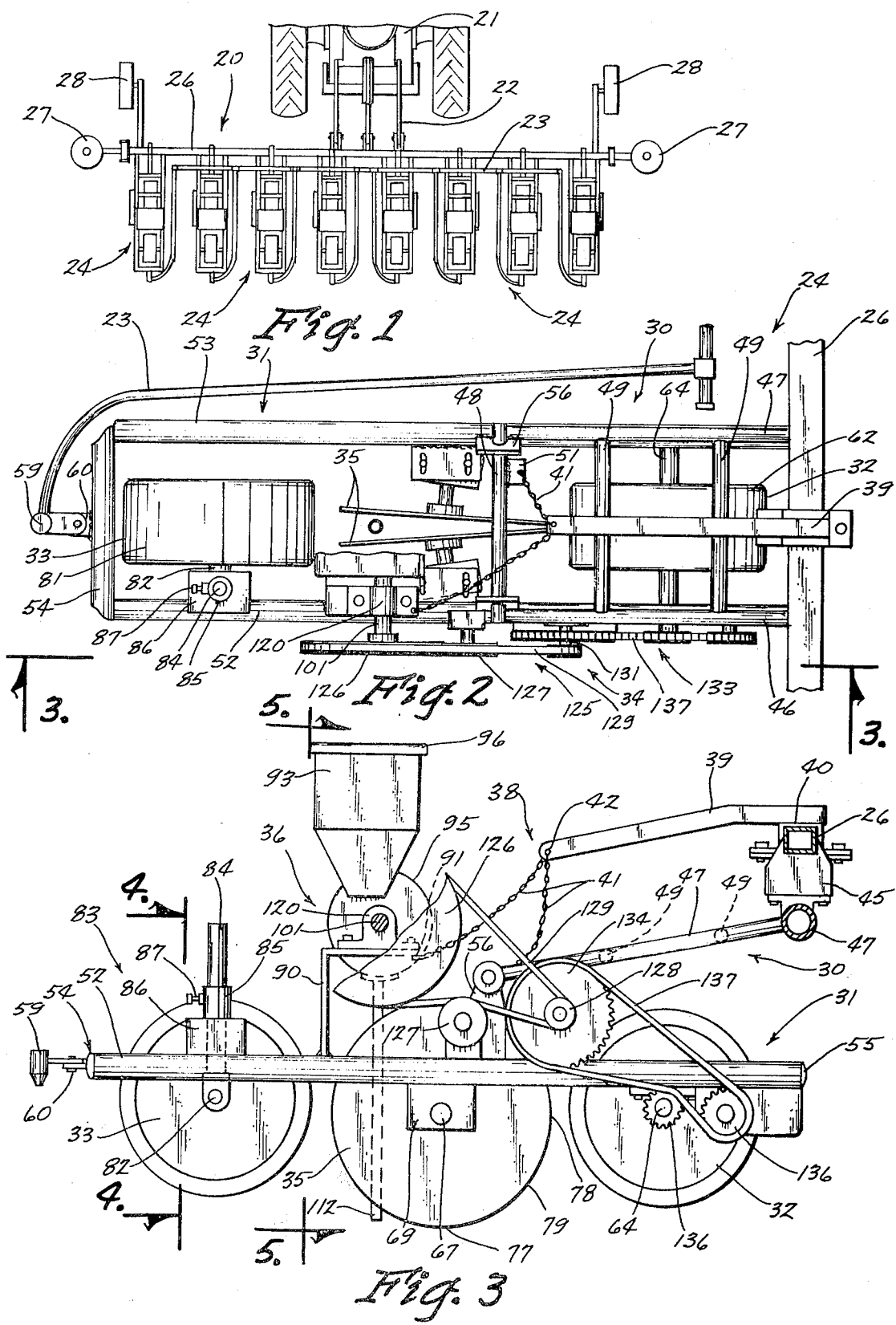

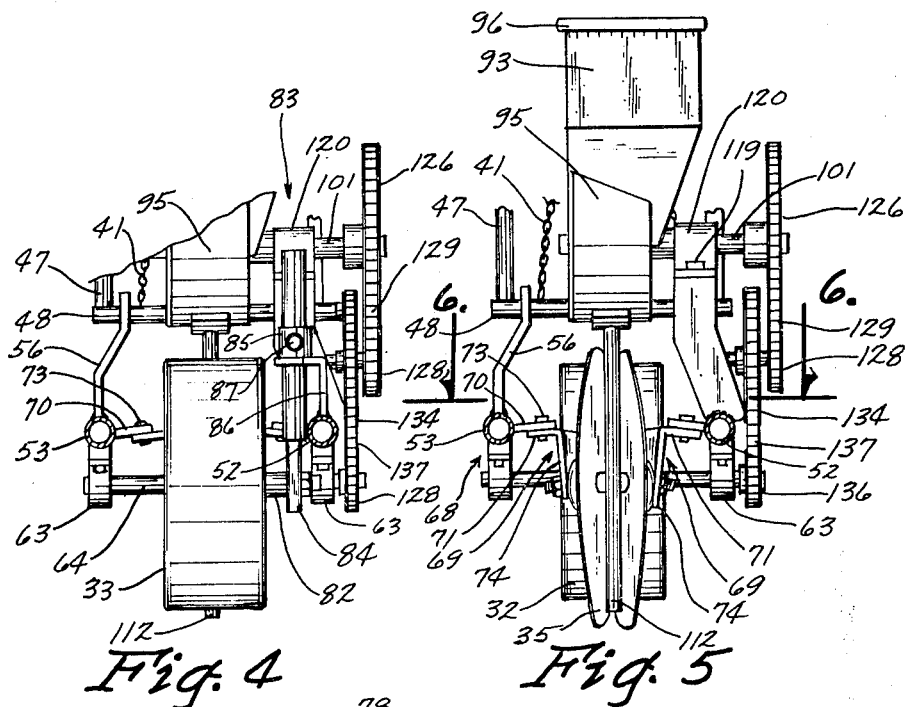
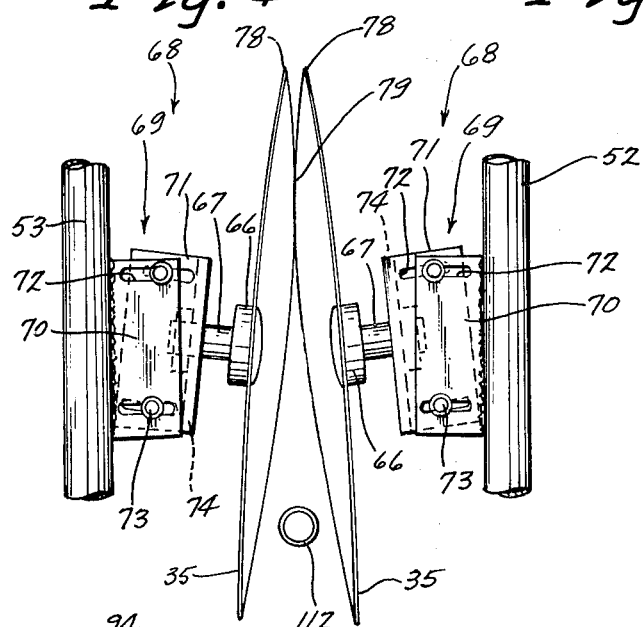
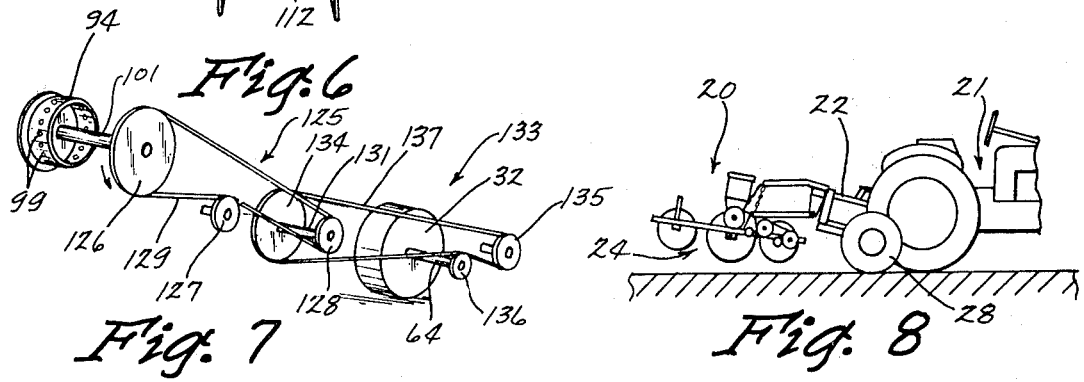

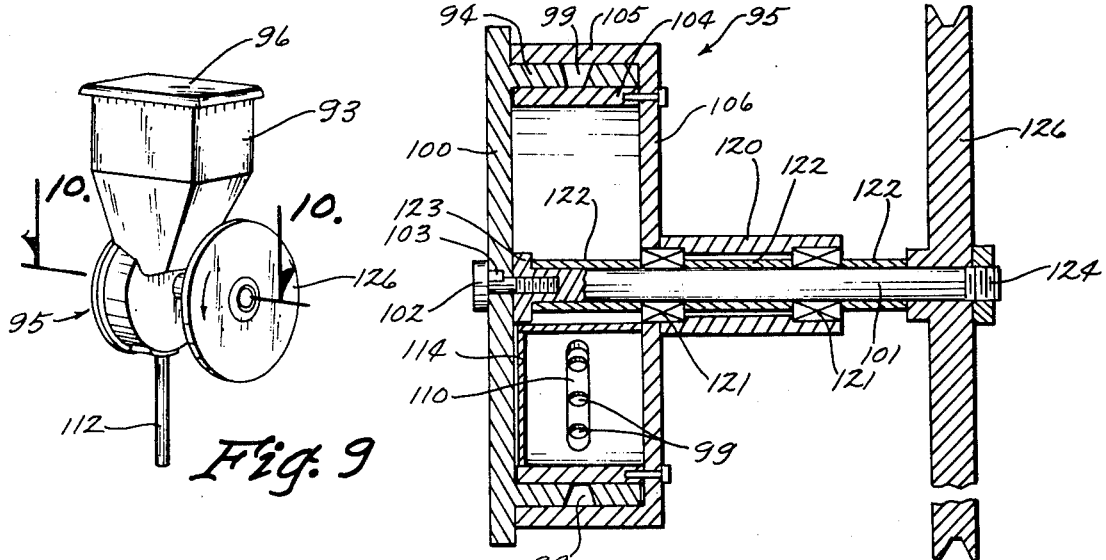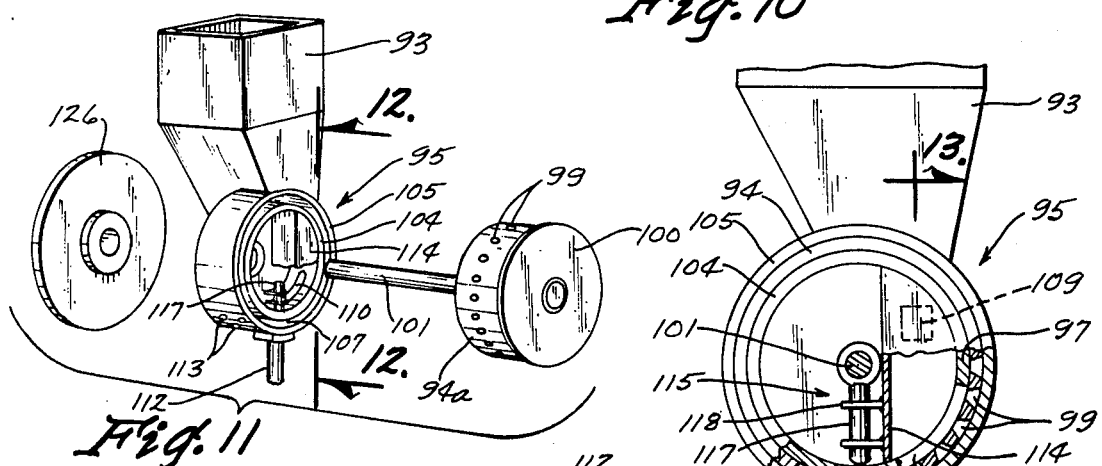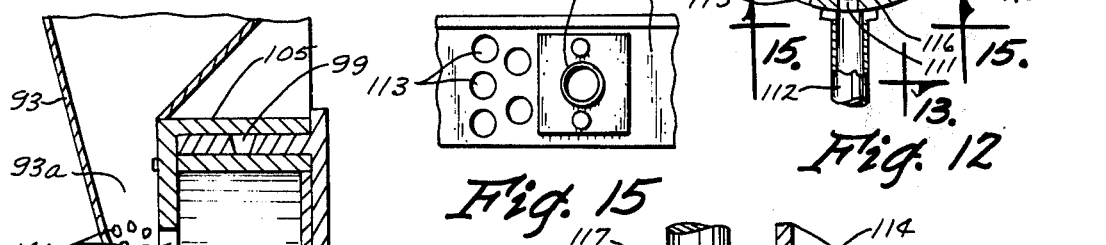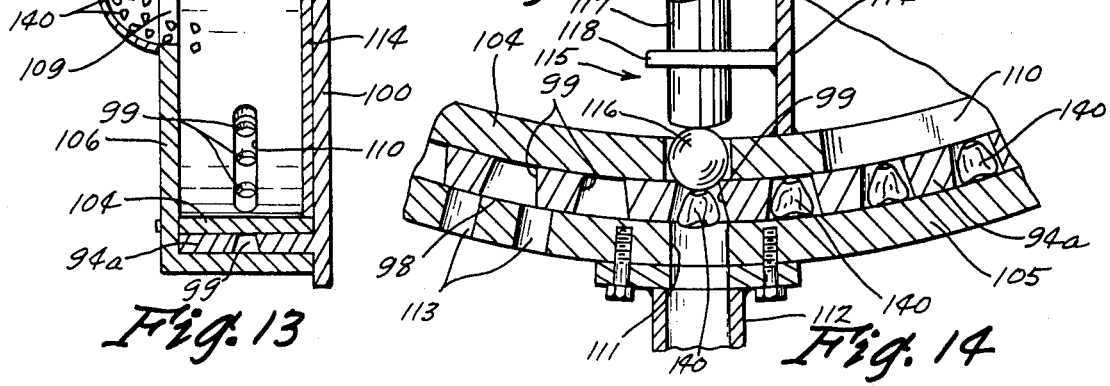

PLANTER APPARATUS

This is a division of application Ser. No. 417,741, filed on Nov. 21, 1973, now U.S. Pat. No. 3,886,875.

BACKGROUND OF THE INVENTION

This invention relates to agricultural apparatus of the type used for the planting of seeds. More particularly this invention relates to apparatus which employ a type of seeding machine known as a grain drill.

There are presently a number of planting machines utilizing various types of grain drills including cup feed, external fluted roll, and internal double run types. Machines employing the cup feed type may only be used on flat land for otherwise the flow of seed to and through the planting units is uneven and irregular from unit to unit. Fluted roll and double run types are limited in that delivery of seeds is either in a continuous flow or in groups of several seeds. These drills do not provide for the precise planting of an individual seed.

Other problems encountered in the operation of a planting machine include following the contour of the ground closely negotiating lumpy soil conditions, forming a furrow of the proper depth and properly spacing the plants when planting. The type of plant being grown necessitates a different combination of answers to each of the above problems. Particular machines have been designed to meet the needs of planting a particular type of plant, but no machine of satisfactory universal application has yet been developed.

SUMMARY OF THE INVENTION

According to this invention a planter apparatus is provided which is suitable for planting a variety of seeds.

The apparatus of this invention includes a tool bar adapted to be attached to a tractor and a pair of vertically disposed frames. The upper frame is pivotally attached to the tool bar, and the lower frame is pivotally attached intermediate its ends to the upper frame. A pair of flat-surfaced wheels are mounted to the lower frame, one in the front portion and one in the rear portion thereof, and a pair of discs are mounted side-by-side therebetween, the discs and wheels being mounted along the longitudinal axis of both frames. A chain drive connected to and driven by the front wheel actuates a pulley drive which in turn actuates a rotating seed discharge mechanism.

The seed discharge mechanism includes a rotating drum driven by the pulley drive which drum is received by a stationary housing. Seed travels from a hopper attached over the housing into a central internal area of the housing. The seed falls from the central area into holes in the rotating drum by which means the drum conveys the seed to a discharge passage in the outer portion of the housing. The seed falls therethrough into an incision made by the discs in the soil compacted by the front wheel. The rear wheel presses the soil over the incision with the seed therein.

Different sizes and types of seed to be planted may be accommodated by utilizing rotating drums with appropriate hole sizes. Spacing of the seeds is varied by changing the gearing of the chain drive or by using a rotating drum with appropriately spaced holes. The discs are vertically and laterally adjustable to provide a furrow of the proper shape and depth.

Accordingly, it is an object of this invention to provide a novel planting apparatus.

It is a further object of this invention to provide a planter apparatus suitable for planting any granular seed raw or pelleted.

Still another object is to provide a planter apparatus capable of effectively operating over lumpy soils and following the contour of the ground.

Another object of this invention is to provide a planter apparatus having discs both vertically and laterally adjustable whereby furrows of any depth, width, and shape may be made including shallow, narrow, flat bottomed incisions in the soil.

Another object of this invention is to provide for vertical adjustment of the discs in a manner that eliminates the need for depth bands to be affixed to the discs.

A still further object of this invention is to provide a planter apparatus with a seed discharge device capable of positively delivering a single seed to a precisely spaced location within a furrow or an incision in the soil.

Another object of this invention is to provide a planter apparatus having a seed discharge device adjustable to plant seed at a variety of linear spacings.

Still another object of this invention is to provide an apparatus capable of such precise delivery of a single seed so as to substantially eliminate such costly farming methods as the thinning of sugar beets by hand labor.

These objects and other features and advantages of this invention will become readily apparent by reference to the following description when taken in conjunction with the accompanying drawings.

BRIEF DESCRIPTION OF THE DRAWINGS

The appended drawings illustrate the invention, wherein:

FIG. 1 is a fragmentary top plan view depicting the planter apparatus invention in attachment with a conventional tractor;

FIG. 2 is an enlarged top plan view of an individual planter unit of this invention;

FIG. 3 is a side elevational view of the planter unit taken along line 3—3 of FIG. 2;

FIG. 4 is a sectional view taken along line 4—4 of FIG. 3 and showing the rear wheel structure;

FIG. 5 is a rear elevational view, partly in section, taken along line 5—5 of FIG. 3 and showing the disc structure;

FIG. 6 is an enlarged top plan view taken along line 6—6 of FIG. 5 depicting the method of attachment and orientation of the discs to the planter unit;

FIG. 7 is a schematic illustration of the drive train of this invention;

FIG. 8 is a reduced side elevation depicting the invention in attachment with a conventional tractor, and showing the planter apparatus elevated out of working engagement with the ground;

FIG. 9 is a perspective view of the seed storage and discharge device of the planter unit;

FIG. 10 is an enlarged horizontal sectional view taken along line 10—10 of FIG. 9;

FIG. 11 is an expoded view in perspective of the seed storage and discharge device;

FIG. 12 is an enlarged, fragmentary partially side elevational and partially sectional view of the seed storage and discharge device taken along line 12—12 of FIG. 11;

FIG. 13 is an enlarged sectional view taken along line 13—13 of FIG. 12 showing the seed transfer structure;

FIG. 14 is a greatly enlarged depiction of a detail of FIG. 12 showing the discharge of a seed structure; and FIG. 15 is a bottom plan view taken along line 15—15 of FIG. 12 and showing the trash discharge structure.

DESCRIPTION OF THE PREFERRED EMBODIMENT

Referring now to the drawings, the planter apparatus of this invention is indicated generally at 20 in FIGS. 1 and 8 in attachment with a conventional tractor 21 by means of a conventional three point hitch 22. The pipe and tubing of the incorporating system for pre-emergence herbicides and the like is indicated at 23. Individual units 24 of this invention, separated by locator plates (not shown), are mounted upon a common tool bar 26 in attachment with the hitch 22. Conventional row guides 27 and side support wheels 28 are attached to the tool bar 26 near each end thereof.

Referring to the depiction of an individual unit 24 of the invention in FIGS. 2 and 3, the invention is comprised generally of the tool bar 26, a U-frame 30, an H-frame 31, a pair of wheels 32 and 33, a drive mechanism 34, a pair of discs 35 and a seed storage and discharge mechanism 36.

More particularly, the tool bar 26 includes a limit mechanism 38 (FIG. 3) for each unit 24 of the invention. The mechanism 39 consists of a boom 39, affixed at one end 40 to extend perpendicular to the tool bar 26, and a pair of chains 41, affixed to the opposite end 42 of the boom 39. The chains 41 depend from the boom 39, one chain 41 attaching to the U-frame 30 and the other chain 41 attaching to the H-frame 31. A shaft 44 is attached parallel to and directly beneath the tool bar 26 by means of connecting plates 45 and extends the length of the apparatus 20.

The U-frame 30 includes right 46 and left 47 side shafts disposed in a parallel manner and joined together at one end by a transverse shaft 48 attached normal to both shafts 46 and 47 with the shafts pivotally attached at the other end to shaft 44. Cross support members 49 parallel to shaft 48 are attached between the side shafts 46 and 47 intermediate the ends of shafts 46 and 47 for bracing. The U-frame 30 is so oriented upon the tool bar 26 that side shafts 46 and 47 extend parallel to the boom 39 and a vertical plane passing through the boom 39 passes through the longitudinal axis of the U-frame 30. A plate 51 is attached to the transverse shaft 48 near to the left side shaft 47 and receives a chain 41 depending from the boom 39.

The H-frame 31 (FIGS. 2 and 3) includes right 52 and left 53 parallel side members joined at each end by perpendicularly affixed rear 54 and front 55 boxed end members. Pivot plates 56 are attached in an upstanding manner to members 52 and 53 midway between the end members 54 and 55. The plates 56 rotatably receive the transverse shaft 48 of the U-frame 30. A nozzle 59 for receiving the tubing of the incorporating pre-emergence system 23 is mounted at the mid-point 60 of the rear boxed end member 54. The vertical plane passing through the boom 39 and the longitudinal axis of the U-frame 30 passes also through the longitudinal axis of the H-frame 31.

The wheel members 32 and 33 and discs 35 are mounted upon the H-frame, all in alignment along the longitudinal axis of the frame 31. The front wheel 32 has a flat outer surface 62 and is mounted upon the forward part of the H-frame 31 by means of forward journal boxes 63 (FIG. 5) which depend from the side members 52 and 53 and receive the axle 64 of the wheel 32.

A pair of discs 35, each having a bearing member 66 centrally affixed with a shaft 67 rotatably received therein, are attached by mounting mechanisms 68 (FIGS. 5 and 6) to the central part of the frame 31. The mechanisms 68 each include an L-shaped first mounting plate 69 and a rectangular second mounting plate 70. The first plate 69 has a portion 71 which is placed against the plate 70 in mounting. Both portion 71 and plate 70 have a pair of elongated slots 72 which are registered in mounting and through which a bolt 73 is passed to secure the mounting plates 69 and 70 together. The depending portion 74 (FIG. 5) of the plate 69 fixedly receives the shaft 67 of the disc 35. The shaft 67 and the portion 71 are oriented in opposite directions from the portion 74.

The second mounting plates 70 are secured to the side members 52 and 53 of the H-frame 31 midway between the end members 54 and 55 and are directed towards each other. The plates 70 are attached at an angle slightly upwards from the horizontal. The portions 71 of the plates 69, when mounted to the plates 70, depend at an angle slightly inward toward the longitudinal axis of the H-frame and away from the vertical. This causes the depending portions 74 to be slightly cocked toward each other whereby they depend in a converging manner relative to each other. The lower edges 77 (FIGS. 3, 5 and 6) of the discs 35 are therefore oriented close together.

The rear wheel 33, (FIGS. 2 and 3) having a flat ground engaging surface 81, includes a half-axle 82 and is attached by an adjustment mechanism 83 to the rear part of the H-frame 31. The mechanism 83 includes a shaft 84 which receives the axle 82 and is slidably received by a sleeve 85. The sleeve 85 is mounted in a vertically disposed position upon a mounting iron 86 which is attached to the rear part of the right side member 52 of the H-frame 31. A tightening bolt 87 passes through the sleeve 85 to the received shaft 84.

The seed storage and discharge mechanism 36 is mounted upon a support plate 90 (FIG. 3) secured to the right side member 52 between the iron 86 and mounting plate 70. A chain 41 from the boom 39 is received by the plate 90 at 91. The mechanism 36 (FIGS. 9–15) includes generally a hopper 93, a rotating drum member 94, and a stationary circular housing 95 within which the drum 94 rotates.

The roughly funnel-shaped hopper 93 is vertically disposed with the lower smaller opening being to the side (FIG. 3). A lid 96 covers the upper larger opening and is held thereon by an internal spring (not shown).

The rotating drum 94 has regularly spaced holes 99 formed therein about its peripheral wall 94a and is closed at one end 100. A shaft 101 is centrally affixed to the closed end 100 by means of a cap screw 102 with a key way 103 and extends through the drum 94 out of the open end of the drum 94 and through a bearing block 120 (FIGS. 2 and 3) for connection to the drive mechanism 34. The holes 99 are slightly flared or countersunk, the flared openings being directed outwardly from the space enclosed by the drum 94 as best illustrated in FIG. 14.

The stationary housing 95 includes an open-ended inner drum 104 (FIG. 13) and an outer drum 105 having a closed end 106. The drum 104 is attached to the end 106 so as to be concentric with the drum 105, thereby forming an annular space 107 therebetween. The rotating drum 94 is received into the annular space 107 (FIG. 11) by the housing 95, the shaft 101 passing centrally through the drums 104, 105 and end 106. The end 106 has an entrance 109 (FIG. 13) formed therein over which the hopper 93 is secured at its lower opening 93a.

An elongated aperture 110 (FIG. 12) is formed in the inner drum 104, and a passage 111 (FIG. 14) is formed in the outer drum 105, the aperture 110, passage 111, and holes 99 all being in the same vertical plane when the drum 94 is received between the drums 104 and 105. The vertical plane also passes through the longitudinal axis of the frames 30 and 31 and the axis of alignment of the wheels 32 and 33 and discs 35. The ends of the drums 94, 104 and 105 are horizontally disposed from the vertical plane, and the shaft 101 is perpendicular to the vertical plane. The entrance 109 is superior to and the elongated aperture 110 and passage 111 inferior to a horizontal plane passing through the shaft 101. A vertical plane passing through the length of the shaft 101 passes also through the passage 111, the entrance 109 and aperture 110 being toward the rear of the unit 24 from the plane. Trash discharge holes 113 (FIGS. 12 and 14), formed in the outer drum 105 next to the passage 111, are toward the front of the unit 24.

An elongated tube 112 (FIGS. 3 and 12) attaches to the housing 95 over the passage 111 and depends between the rear portions of the discs 35 for transmitting the seed into the ground as described hereinafter.

A vertically disposed L-shaped internal wall 114 (FIG. 13) attaches between the end 106 and the portion of the inner drum 104 distal therefrom, forming a container which includes the extrance 109 and aperture 110. A seed driving mechanism 115 (FIGS. 12 and 14) is affixed to the inner drum 104 and inner wall 114 for effecting positive drilling of the seed. The mechanism includes a ball 116 mounted in the drum 104 opposite the passage 111 formed in the drum 105, and a plunger 117 slidably mounted by means of support blanks 118 secured to the wall 114, and which plunger 117 is disposed in alignment with the ball 116 and passage 111. The ball 116 has a diameter slightly greater than the diameter of the inwardly directed openings 97 of the holes 99, and as shown in FIG. 14 the ball actually engages a seed 140 being held within a hole 99 and aids gravity and circumferential force in discharging the seed out of the hole and through the passage 111 to the discharge tube 112.

A journal box 120 (FIGS. 3 and 5) is affixed to the housing 95 at the central part of the closed end 106 and external to the drums 104 and 105. The box 120 receives the shaft 101 upon bearings 121 (FIG. 10) mounted therein after the shaft 101 passes through the end 106. The rotating drum 94 is thereby supported within the annular space 107 and does not touch the drums 104 and 105 when rotating, effecting therefore a frictionless rotation. Spacers 122 are located between the flared end 123 of the shaft 101, the pulley 126 affixed to the opposite end 124 of the shaft 101, and the bearings 121. Attachment of the seed storage and discharge mechanism 36 to the H-frame 31 is by securing the journal box 120 to the support 90. Flange and locknut means 119 are provided for doing this.

The drive mechanism 34 includes a U-belt pulley system 125 (FIG. 7) and a chain and sprocket system 133. The pulley system 125 includes a pulley 126 affixed to the end of the rotating drum shaft 101. A tightening pulley 127 is affixed to the side member 120 of the H-frame 31 between pulley 127 and 128. The pulley 128 is attached to one end of a common shaft 131 which is rotatably mounted on the side member 52. A belt 129 is engaged by the pulleys 126, 127 and 128. The sprocket system 133 includes a sprocket 134 mounted to the end of the common shaft 131 opposite the pulley 128. A forward sprocket 135 is rotatably mounted on the side member 52, and a drive sprocket 136 is mounted at the end of the axle 64 of the front wheel 32 and between the sprockets 134 and 135. A chain 137 engages the sprockets 134, 135 and 136.

Before the invention is to be operated, the gearing of the drive mechanism 38 is adjusted. This is done by placing a drive sprocket 136 of the desired size upon the axle 64 of the front wheel 32. The rate at which the rotating drum 94 moves is directly regulated by this adjustment. A drum 94 is used having appropriately sized and spaced holes 99 for the particular seed 140 being planted.

The rear wheel 33 is set at the desired vertical distance from the H-frame 31 by sliding the shaft 84 to the proper position within the sleeve 85 of the adjustment mechanism 83 and locking the shaft 84 in place with the tightening bolt 87. The depth of the incision that the discs 35 will make is thereby determined by this adjustment.

A third adjustment made before the invention is operated fixes the orientation of the discs 35. The discs 35 are already cambered bringing the lower edges 77 close together, since the mounting mechanisms 68 are affixed to the H-frame 31 at an angle upward from the horizontal. The adjustment brings the leading edges 78 (FIG. 5) of the discs 35 closer together so that the lower leading edges 79 are brought together at a position as viewed (FIG. 3) of about 4:30, and at a point oriented along the longitudinal axis of the H-frame and in alignment with the front 32 and rear 33 wheels and seed tube 112.

A final adjustment is the proper lateral spacing of the units 24 along the tool bar 26 so that the proper row spacing is achieved during planting.

The necessary adjustments having been made, the invention 20 is lowered, by operation of the hitch 22, into engagement with the ground. The wheels 32 and 33 (FIG. 3) press against the ground and the discs 35 pass into the ground. The seed tube 112 depends between the discs 35 to a close proximity with the ground. As the tractor 21 draws the planter apparatus 20 over the ground, the U-frames 30 pivot about the shaft 44, and the H-frames 31 pivot or rock about the shafts 48 of the respective U-frames 30. The pivoting and rocking of the frames 30 and 31 permits the wheels 32 and 33 and discs 35 to remain in contact with the ground whether flat, hilley or irregular. The use of individually mounted units 24, provides for very efficient following of surface contours.

The front wheel 32 (FIG. 3) engages the ground with its flat surface 62 and compacts the soil. The wheel 32, by attachment to sprocket 128, turns the drive mechanism 34 which in turn actuates the seed storage and discharge mechanism 36. The drive sprocket 136 drivingly engages the chain 137 imparting rotation to the sprocket 134, common shaft 131, and pulley 128. The pulley 126 is driven by the belt 129 engaging the pulley 128, and the rotating drum member 94 is actuated through rotation imparted by the pulley 126 through the shaft 101. The direction of rotation of the wheel 32 and sprocket 136 is opposite that of the pulley 126 and drum 94, the former being clockwise and the latter being counterclockwise when the unit 24 is viewed from the right hand side (FIGS. 3 and 7).

Seed 140 which has been placed in the hopper 93 (FIG. 13) passes through the entrance 109 into the chamber formed by the wall 114, the closed end 106, and the inner drum 104. The seed 140 passes through the aperture 110 into the holes 99 (FIG. 12) of the rotating drum 94 as they pass by the aperture 110. The elongation of the aperture 110 ensures greater efficiency in the filling of the holes 99 than a more bore hole would.

The seed 140, in the holes 99, is then carried by the drum 94, a portion of the seed sliding against the drum 105, into alignment with the seed driving mechanism 115 and the passage 111. The seed 140 falls, aided both by gravity and the action of the driving mechanism 115, out of the hole 99 through the passage 111 into and through the seed tube 112 to the ground. The ball 116 of the driving mechanism 116 rolls in place against the rotating drum 94, falling periodically partially into the hole 99. The plunger 117 slides within its supports 118 following the ball 116 and striking it when it completes its partial fall. The impact of the ball 116 and of the plunger 117 transferred through the ball 116 aid in driving the seed 140 from the hole 99. As the drum 94 rotates further, the ball 116 rolls out of the hole 99, sliding the plunger 117 upward again. The empty hole 99 then passes by the discharge holes 113 where trash caught in the holes 99 and between the drums 104, 105 and 94 is passed out of the housing 95.

Prior to in time, and structurally leading the seed tube 112, the lower edges 77 of the discs 35 penetrate the soil, the discs 35 and their permanently affixed bearings 66 rotating about the fixed shaft 67, always with the lower leading edges 79 touching. Properly adjusted, for sugar beets, for example the discs 35 will penetrate the soil about ¼ inch, the lower leading edges 79 meeting just above the surface of the soil. An incision is thereby formed in the ground into which about every nine inches, if correctly adjusted, again for sugar beets, seed 140 falls from the seed tube 112. The following wheel 33 then engages the ground with its flat surface 81 compressing the soil over the incision with the seed 140 therein.

When the planter apparatus 20 is disengaged from the ground, the pivoting of the U-frame 30 and the rear portion of the H-frame 31 toward the ground is limited by the chains 41 and boom 39, of the limiting mechanism 38. Pivoting of the U-frame upward and of the front portion of the H-frame 31 downward is not hindered by the limit mechanism 38. This allows for easy accessibility to the parts of the apparatus 20 which are adjusted before usage.

Thus it can be seen that the objects of the invention are fulfilled by the preferred embodiment of the invention.

Although a preferred embodiment has been disclosed herein, it is to be remembered that various modifications and alternate constructions can be made thereto without departing from the full scope of the invention, as defined in the appended claims.

I claim:

1. For use in planting machines, a seed storage and discharge device comprising:
    a hopper for holding seed;
    a rotatable drum having regularly spaced holes formed therein; and
    a stationary housing including an inner fixed drum having an elongated aperture formed therein, an outer fixed drum having a passage formed therein, and a closed end with an entrance formed therein, said hopper being attached to said outer drum over said entrance whereby seed in said hopper is delivered to said housing, said inner drum being attached to said closed end whereby an annular space is formed between said fixed drums, said rotatable drum being received into said annular space, said holes, aperture, and passage being in the same plane, whereby said holes are periodically registered sequentially first with said aperture and secondly with said passage by movement of said rotatable drum, said seed being thereby transferred from said housing through said rotatable drum to the ground;
    and further wherein said housing includes an internal wall member attached between said closed end and said inner drum whereby a container is formed with said entrance and said aperture included therein.

2. For use in planting machines, a seed storage and discharge device comprising:
    a hopper for holding seed;
    a rotatable drum having regularly spaced holes formed therein; and
    a stationary housing including an inner fixed drum having an elongated aperture formed therein, an outer fixed drum having a passage formed therein, and a closed end with an entrance formed therein, said hopper being attached to said outer drum over said entrance whereby seed in said hopper is delivered to said housing, said inner drum being attached to said closed end whereby an annular space is formed between said fixed drums, said rotatable drum being received into said annular space, said holes, aperture, and passage being in the same plane, whereby said holes are periodically registered sequentially first with said aperture and secondly with said passage by movement of said rotatable drum, said seed being thereby transferred from said housing through said rotatable drum to the ground;
    and further wherein said housing includes means for trash and refuse discharge located next to said passage, said holes registering with said trash means thirdly.

\* \* \* \* \*